J. PRESTON.
PLOW.
No. 189,136.
Patented April 3, 1877.
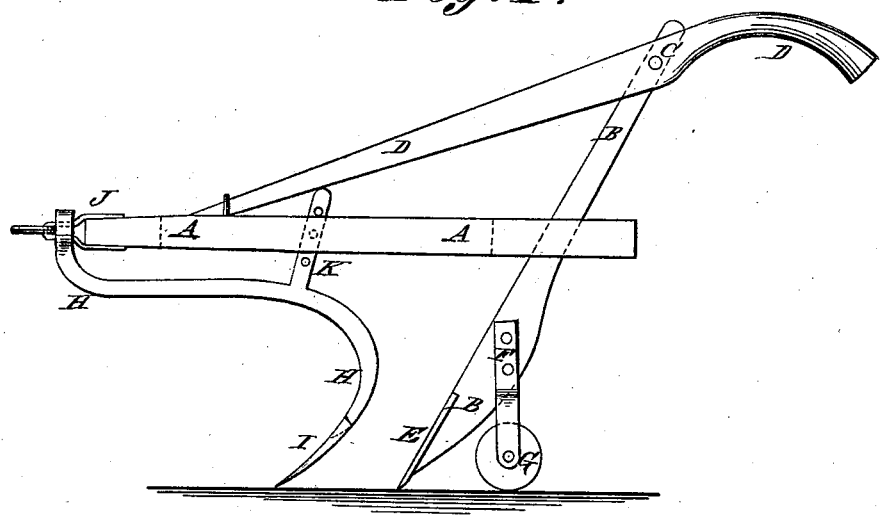
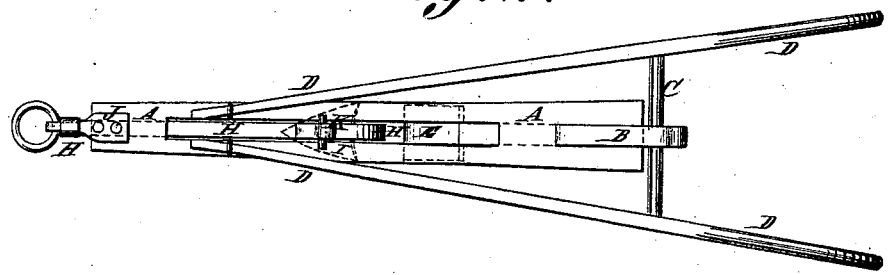
WITNESSES:
INVENTOR:

UNITED STATES PATENT OFFICE.

JOHN PRESTON, OF MILLFORD, KENTUCKY.

IMPROVEMENT IN PLOWS.

Specification forming part of Letters Patent No. 189,136, dated April 3, 1877; application filed February 10, 1877.

*To all whom it may concern:*

Be it known that I, JOHN PRESTON, of Millford, Bracken county, Kentucky, have invented a new and Improved Plow, of which the following is a specification:

Figure 1 is a side view of my improved plow, and Fig. 2 is a top view of the same.

Similar letters of reference indicate corresponding parts.

The object of this invention is to furnish an improved plow which shall be so constructed that it may be used for laying off or marking land, and for making hills for tobacco, cabbages, and other kinds of plants to be transplanted, for covering corn, and as a shovel-plow, and which shall be simple in construction, convenient in use, and effective in operation in either capacity.

The invention consists in the combination of the curved beam, provided with the plow-plate and the rigid perforated bar, with the slotted beam, the standard, provided with the square plow and the roller, and the handles, as hereinafter fully described.

A represents the plow-beam, to the rear end of which is attached the standard B. The standard B projects above the beam A, and to its upper end is attached the middle part of a round, C, to the ends of which are attached the handles D. The forward ends of the handles D are attached to the forward part of the beam A.

To the lower end of the standard B is attached a square plow-plate, E. To the opposite sides of the lower part of the standard B are attached the upper ends of two bars, F, to and between the lower ends of which is pivoted a small roller, G.

H is a short plow-beam, the rear part of which is curved downward to serve as a standard, and to its lower end is attached a shovel-plow, I. The forward end of the beam H is curved upward, and has a slot formed in it to receive the clevis J of the plow-beam A, so that it may be drawn by said clevis.

To the rear part of the beam H, just in front of its downward bend, is rigidly attached the lower end of a bar, K, which passes up through a longitudinal slot in the beam A, and has a number of holes formed through it to receive a pin, which pin rests upon the upper side of the beam A, and limits the depth to which the plow I enters the ground.

In using the plow for preparing the ground for transplanting plants, the plow I opens a furrow, along which the square plow E follows, pushing the loose soil before it. At the point where each plant is to be set out the plow-handles D are raised, which causes the plow E to leave and pass over the soil collected before it. As the plow E is again dropped to the ground, the roller G presses upon the little heap of soil left by the plow E, and flattens and smooths it, ready to receive the plants.

For covering seed, the beam H is detached, the square plow E is drawn along the furrow, and is raised by the handles D at each hill.

To adjust the machine for use as a shovel-plow, the beam H and the square plow E are detached, and the shovel-plow plate 1 is attached to the standard B.

Having thus described my invention, I claim as new and desire to secure by Letters Patent—

The combination of the curved beam H, provided with the plow-plate I and the rigid perforated bar K, with the slotted beam A, the standard B, provided with the square plow E and the roller G, and the handles D, substantially as herein shown and described.

JOHN PRESTON.

Witnesses:
   DICK STEELE,
   MOWARD MORELAND.